(12) United States Patent
Regelsberger et al.

(10) Patent No.: US 8,934,133 B2
(45) Date of Patent: *Jan. 13, 2015

(54) HIGH-SPEED MULTI-COLOR PRINTING

(71) Applicant: Eastman Kodak Company, Rochester, NY (US)

(72) Inventors: Matthias H. Regelsberger, Rochester, NY (US); Stacy M. Munechika, Fairport, NY (US); Christopher B. Liston, Rochester, NY (US); James A. Katerberg, Kettering, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,683

(22) Filed: Mar. 25, 2013

(65) Prior Publication Data

US 2014/0285821 A1    Sep. 25, 2014

(51) Int. Cl.
| | |
|---|---|
| *G06K 15/10* | (2006.01) |
| *H04N 1/60* | (2006.01) |
| *H04N 1/04* | (2006.01) |
| *H04N 1/46* | (2006.01) |
| *G06K 15/02* | (2006.01) |

(52) U.S. Cl.
CPC .................................. *G06K 15/1868* (2013.01)

USPC ............. 358/1.2; 358/1.8; 358/1.9; 358/474; 358/502; 358/526; 358/540

(58) Field of Classification Search
CPC ... G06K 15/02; G06K 15/027; G06K 15/102; G06K 15/1223; G06K 2215/101; G06K 2215/111; G06K 2215/0054; H04N 1/405; H04N 1/506; H04N 1/0054
See application file for complete search history.

(56) References Cited

U.S. PATENT DOCUMENTS

| | | | | |
|---|---|---|---|---|
| 5,771,050 | A  * | 6/1998  | Gielen  | ........................... 347/19 |
| 2009/0086294 | A1 * | 4/2009  | Sakakibara | .................. 358/514 |
| 2011/0242187 | A1 * | 10/2011 | Mongeon et al. | ............... 347/19 |
| 2012/0206530 | A1 |  8/2012 | Mizes et al. | |

* cited by examiner

*Primary Examiner* — Eric A Rust
*Assistant Examiner* — Haris Sabah
(74) *Attorney, Agent, or Firm* — Nelson Adrian Blish

(57) ABSTRACT

A multi-resolution imaging device (10) for a high-speed multi-color printer includes at least one high-resolution sensor array (23), wherein an output of the high-resolution sensor array is transmitted to a controller (19); at least one low-resolution sensor array (24); wherein the controller calculates a correction for stitch; wherein the controller, based on the calculated correction, adjusts a timing of image data provided to individual print elements comprising print stations (12) to aligned an output of the print elements; and wherein the low-resolution sensor array provides full page viewing.

24 Claims, 16 Drawing Sheets

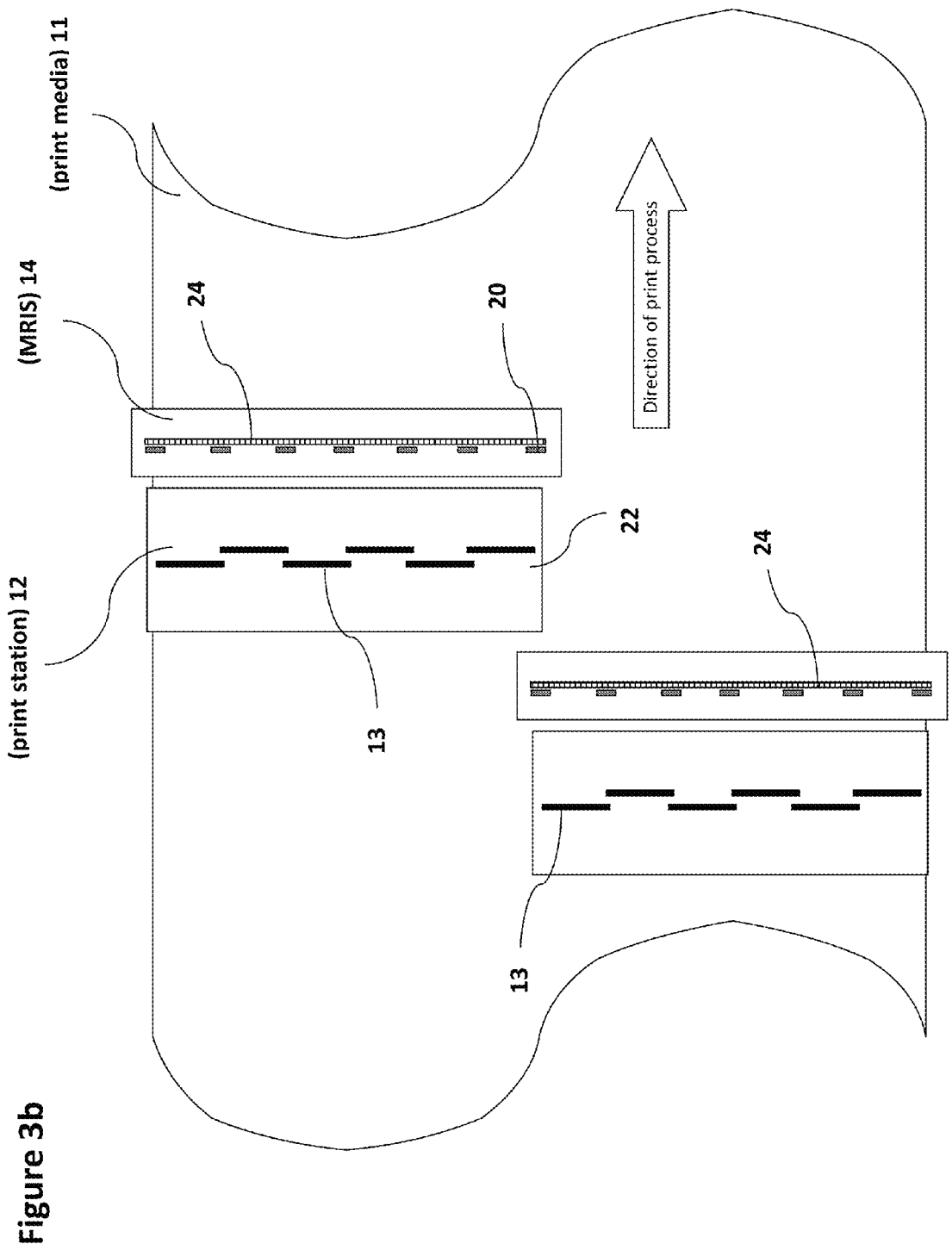

HIGH-SPEED MULTI-COLOR PRINTING

CROSS REFERENCE TO RELATED APPLICATIONS

Reference is made to commonly-assigned copending U.S. patent application Ser. No. 13/849,713 filed Mar. 25, 2013, entitled METHOD FOR MULTI-COLOR HIGH-SPEED PRINTING, by Regelsberger et al.; and U.S. patent application Ser. No. 13/599,160 (now U.S. Publication No 2014/0063532), filed Aug. 30, 2012, entitled MULTI-RESOLUTION SEGMENTED IMAGE SENSOR, by Munechika et al.; the disclosures of which are incorporated herein.

FIELD OF THE INVENTION

The present invention relates in general to printing and in particular to low-resolution and high-resolution sensors for multi-station printers.

BACKGROUND OF THE INVENTION

In large print systems multiple system calibrations are performed by sensing the position of printed marks and making adjustments based on the results of these measurements. Often multiple sensor systems are employed to perform each of the calibrations because the required qualities of the sensors, for example, spatial resolution, differ from application to application. Such system according to prior art is schematically shown in FIG. 11.

In a print system for wide receivers it is often necessary to align multiple print elements so they can function as one wide print station to span the width of the receiver. For example, in large inkjet printers, multiple 6" wide print elements are combined to print on 19" or 25" wide paper or other print media imaging e.g. 17" or 23" wide (allowing for some overlap between print elements). In another example, multiple LED-exposure devices, each of them 14" wide, might be combined to cover a receiver width of 28" in a large electrophographic print system imaging e.g. 27" wide (allowing for some overlap between print elements). Since the print elements cannot be mounted end to end they are offset from each other in the direction of media travel. To print a straight line of data on the receiver, the printing on each print element must be enabled at different times so that the image is printed in alignment on the receiver. This timing adjustment produces alignment in the direction of media travel.

In large print systems, multiple successive print stations are arranged sequentially to produce the desired output on the receiver by successive printing steps. For a four color print system, four sequential print stations deposit the four process colors cyan, magenta, yellow, and black to create a four-color print. A second set of four print stations might follow to deposit another set of four colors on the reverse side of the receiver. In such a printing system, each color plane on a side of the receiver corresponds to a single image plane. For printing processes producing electrical circuits, the print system might consist of just three print stations to deposit a conductive layer, an insulating layer and a second conductive layer on a flexible print media each of the deposited layers being a separate image plane. Each print station in the print system deposits one image plane according to the design and sequence of the individual print station in the print system. The quality of the printed output is dependent on the accuracy in placing printed dots within each print station composed of various print elements and the accuracy of placing the printed dots of one image plane (printed by one print station) to the printed dots of another image plane (printed by another print station).

For a print stations composed of multiple print elements, there must be a certain amount of overlap between print elements in the cross travel direction to be able to compensate for mechanical tolerances in the assembly. Alignment in the cross travel direction is achieved by selecting the smallest addressable picture element (pixel or printed dot) on which one print element stops printing and the next print element starts printing. A method to align the print elements is to print marks from each print element, measure the marks, and adjust the print timing (e.g. with line delays) and overlap pixel for optimal printing. The process to select the correct time delay between print elements (in direction of the print process) and the selection of the printed dot printed using one print element and the adjacent printed dot printed using the adjacent print element (in direction perpendicular to the print process) is referred to as stitching. It is the objective of this stitching process to print a line of a single printed dot (pixel) wide across the entire width of the receiver without discernible artifacts indicative of missing dots in the printed line or misplaced dots not in-line with a straight line.

For this first application, a common method to do this is to use high-resolution digital cameras to measure marks from each print element and make the adjustments. Similarly, for even larger printing systems multiple print stations are combined side-to-side to form a wide-format print system covering a total printing width of multiple print stations wide.

In a high quality multi-color print system the individual color planes are generated by separate print stations. The individual color planes should be printed directly on top of each other. Even though mechanical alignment of the print stations might be perfect with respect to a mechanical datum, conveyance of the flexible web-based receiver (paper or plastic) along the print stations in the printer will generally not enable the individual colors to be printed on top of each other due to variation in receiver motion past the print stations and to dimensional changes of the web (stretching, shrinkage) along the conveyance path. Any pixel placement error is called misregistration and is unacceptable.

For a second application, a common method to maintain good registration is to measure the positions of the colors regularly and adjust the positions of the colors during the print process. The first and second applications require a high-resolution imaging device to measure and evaluate the captured image for necessary corrections for good registration and artifact free transition between print elements. The latter is also referred to as stitching of images without artifacts. Test patterns overlapping the transition from one print element to the adjacent to assess the stitch quality can either be printed in a special calibration routine or placed in the area between output images during normal print production. In both cases, the controller sequences the generation of test patterns and, in concert, sequences the capture and evaluation of test patterns to yield the required correction for color placement and exposure timing and pixel overlap.

A third application includes a group of functions intended to assess the quality of the printing process. This third application commonly includes the detection of defects such as streaks, or other unintended density non-uniformity within a page, or missing lines of data and the visualization of completed images as they are printed.

A fourth application includes the evaluation of printed density in the output. Either predetermined areas (color patches) generated in between output images or user defined areas of the output images are processed and compared with either predetermined target values or customer defined target density values. For the third and fourth application, a low-resolution imaging device is sufficient to capture streaks, missing lines or evaluate the color of defined test areas.

Current implementations use multiple sensor systems for these functions. For example, multiple high-resolution cameras with small fields of view can be used for the first two applications while a line array with a wide field of view can be used for the third and fourth application. Such arrangement of multiple sensor systems according to prior art is schematically shown in FIG. 11. Because of bandwidth limitations in the data acquisition electronics, it is not practical to acquire the full image width at high-resolution. The processing of large amount of data at high speed becomes very expensive.

SUMMARY OF THE INVENTION

Briefly, according to one aspect of the present invention, a multi-resolution imaging device for a high-speed multi-color printer includes at least one high-resolution sensor array and one low-resolution sensor array. An output of the high-resolution sensor is transmitted to a controller and the controller calculates a correction for stitch and registration and aligns an output of the printed dots. A low-resolution sensor provides full page viewing and the detection of other defects.

Furthermore, the high-resolution sensor array allows monitoring of the stitch and registration quality during the printing process by evaluating test patterns that are placed regularly in the area between output images. These test patterns are specifically designed for registration measurement and stitch accuracy.

In addition, a single uniform bright LED-illumination bar may be integrated into the multi-resolution segmented image sensor (MRIS). The LED-light source is providing uniform illumination for the image areas scanned by the low- and high-resolution sensor arrays of the MRIS.

Similarly, a single lens array (e.g. Selfoc™ gradient-index lenses) may be integrated into the multi-resolution segmented image sensor (MRIS). The lens array is common to both the low-resolution and the high-resolution sensor arrays of the MRIS and provides a single image of the printed output to both type of sensors arrays.

The present invention presents a novel method and apparatus to combine sensor arrays for multiple control functions. Specifically, this invention provides a means of combining the sensor arrays needed for alignment (overlap and timing) of the print elements (stitch), control of color to color registration, and defect detection and page visualization and color density control.

The invention and its objects and advantages will become more apparent in the detailed description of the preferred embodiment presented below.

BRIEF DESCRIPTION OF THE DRAWINGS

FIG. 2b is a planar view showing printing elements and sensor arrays according to an embodiment of the present invention for the schematic arrangement showing in FIG. 2a.

FIG. 3b is a planar view showing printing elements and sensor arrays according to an embodiment of the present invention for the schematic arrangement showing in FIG. 3a.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
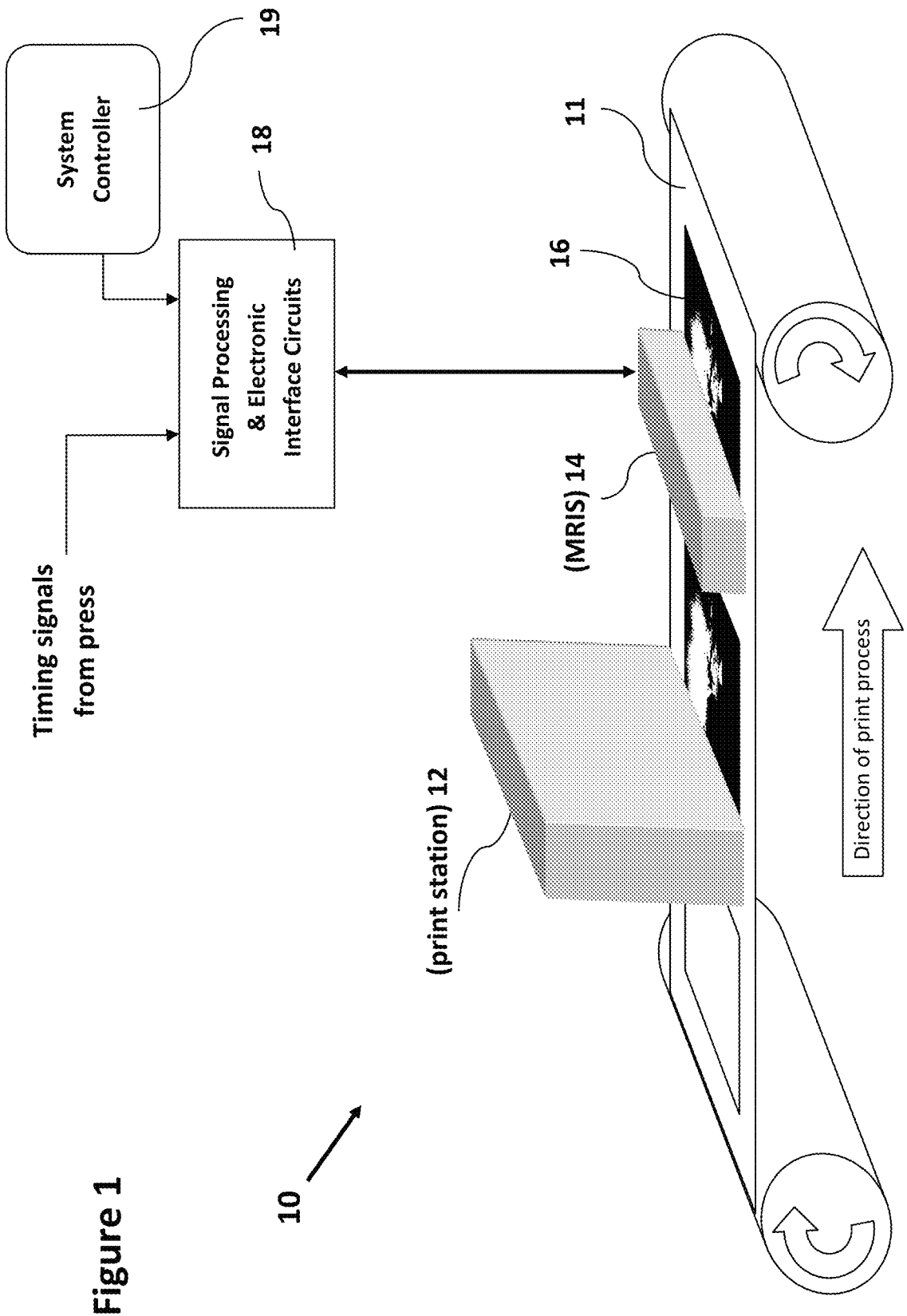
FIG. 1 is a schematic view of a multi-resolution segmented image sensor (MRIS) in a print system with a single print station according to the present invention.

Referring now to FIG. 1 diagrammatically illustrates a printer system 10 with a single print station 12 containing multiple print elements for printing images 16, and a multi-resolution image sensor (MRIS) 14. In FIG. 1, the MRIS is separated from the print station for clarity of the printing process with respect to the print station and the MRIS. The MRIS is oriented to provide full width image of the print media 11 and, thus, the output prints 16 as the print media substrate traverses across the MRIS. Start of frame (SOF) and start of line (SOL) timing signals from the press machine-control electronics, not shown, provide synchronizing signals to initiate the scanning operation of the MRIS commensurate with a known starting location of the printed substrate 11. In some embodiments of the printing system, the print stations comprise inkjet print modules. In other embodiments, the print stations comprise LED-writers or other electrophotographic printing modules.

Figure 2A:
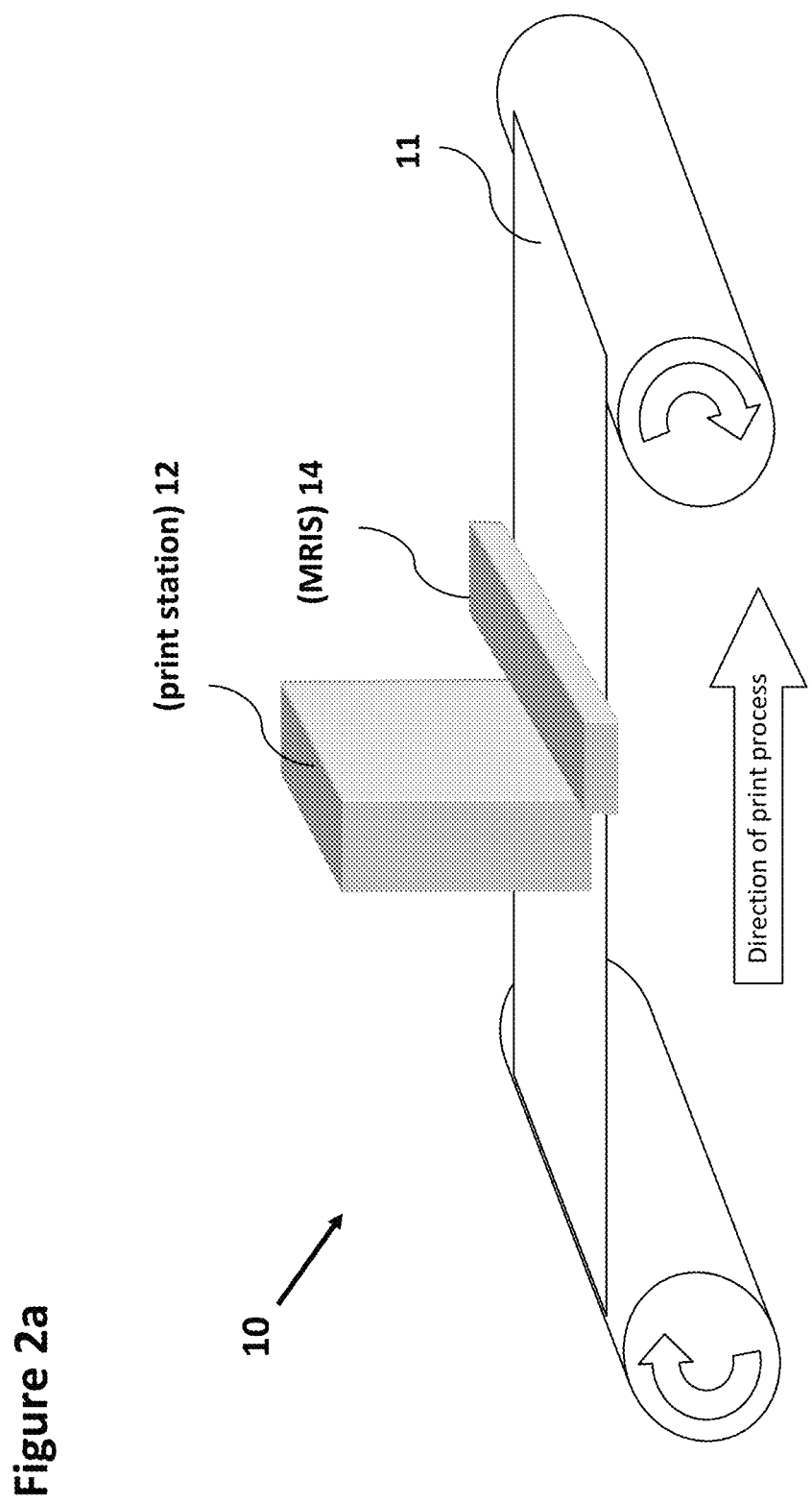
FIG. 2a is a schematic view of a multi-resolution segmented image sensor (MRIS) in a print system with a single print station. The MRIS is in close proximity to the print station according to the preferred implementation of this invention.
Figure 2B:
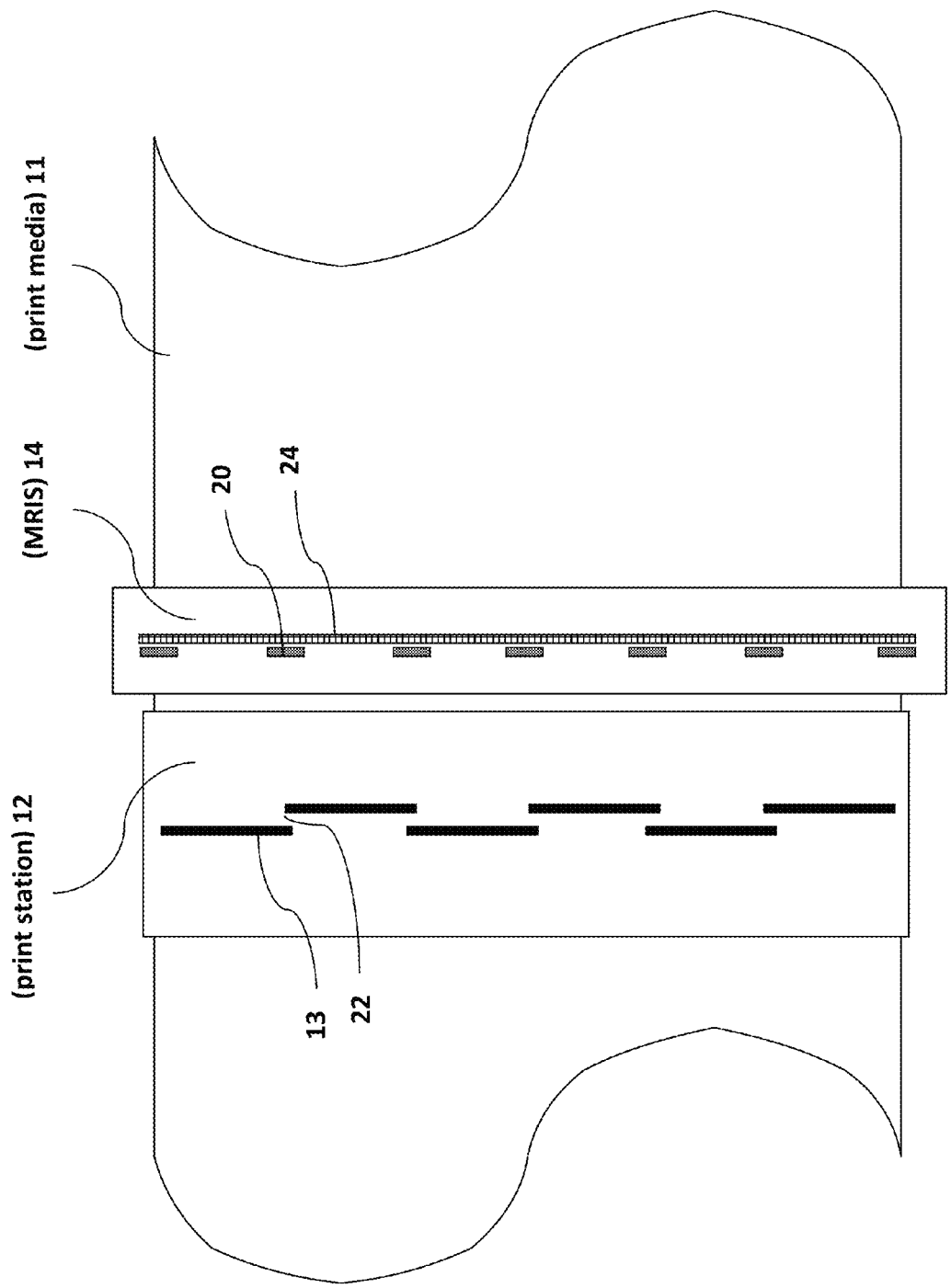

The preferred arrangement of print station and MRIS is shown in FIG. 2a. The MRIS is in close proximity to the print station to minimize errors introduced by transport motions perpendicular to the direction of the printing process and to minimize timing delays for control signals from the MRIS back to the print station. In this embodiment, the print station 12 includes a plurality of print elements 13; each of the print elements printing a swath of the entire print width. The individual print elements have a small region of overlap so that adjacent print swaths can be stitched together. The regions of overlap where the stitching occurs are called the stitch locations. For the arrangement of print station and MRIS in FIG. 2a, a planar view of the print elements and the high-resolution and low-resolution sensor arrays of the MRIS are shown in FIG. 2b. The high-resolution sensor array is made up of a plurality of discrete segments of the high-resolution sensor array. The discrete segments are separated from each other, with the discrete high-resolution sensor arrays 23 of the MRIS are arranged such that their position lines up with the stitch locations 22 of each print element 13 of the print station as the print media traverses from the print station 12 to the MRIS 14. All the high-resolution sensor arrays 23 together form an array of high-resolution sensing elements 20 arranged in a non-continuous manner and are spanning the full width of the low-resolution sensor array 24. The MRIS is also shown to extend beyond the edges of the print media 11. The MRIS 14 can be used to detect the edge of the print media 11 using either or both the low-resolution sensor array 24 or the high-resolution sensor arrays 23. Data related to the placement of the print media 11 edges can be used by the system controller to ensure proper placement of the printed image at the desired lateral or crosstrack position on the print media 11. The edge location data can also be used to confirm the proper width of print media is being used for the print job. The detected edge location data can also be used as inputs to a print media steering mechanism to ensure that the print media is located at the desired crosstrack location as it passes through the print zone containing the plurality of print stations. In other embodiments, the linear sensor is not sufficiently wide to enable it to detect an edge of the print media when the linear sensor is positioned to span the print width of the print station. In such embodiments, the substrate to which the high-resolution sensor array and the low resolution sensor array are bonded can be translated in the crosstrack direction to enable the linear sensor to align with an edge of the print media so that the edge can be detected by at least one of the low resolution and the high-resolution sensor arrays.

Figure 3A:
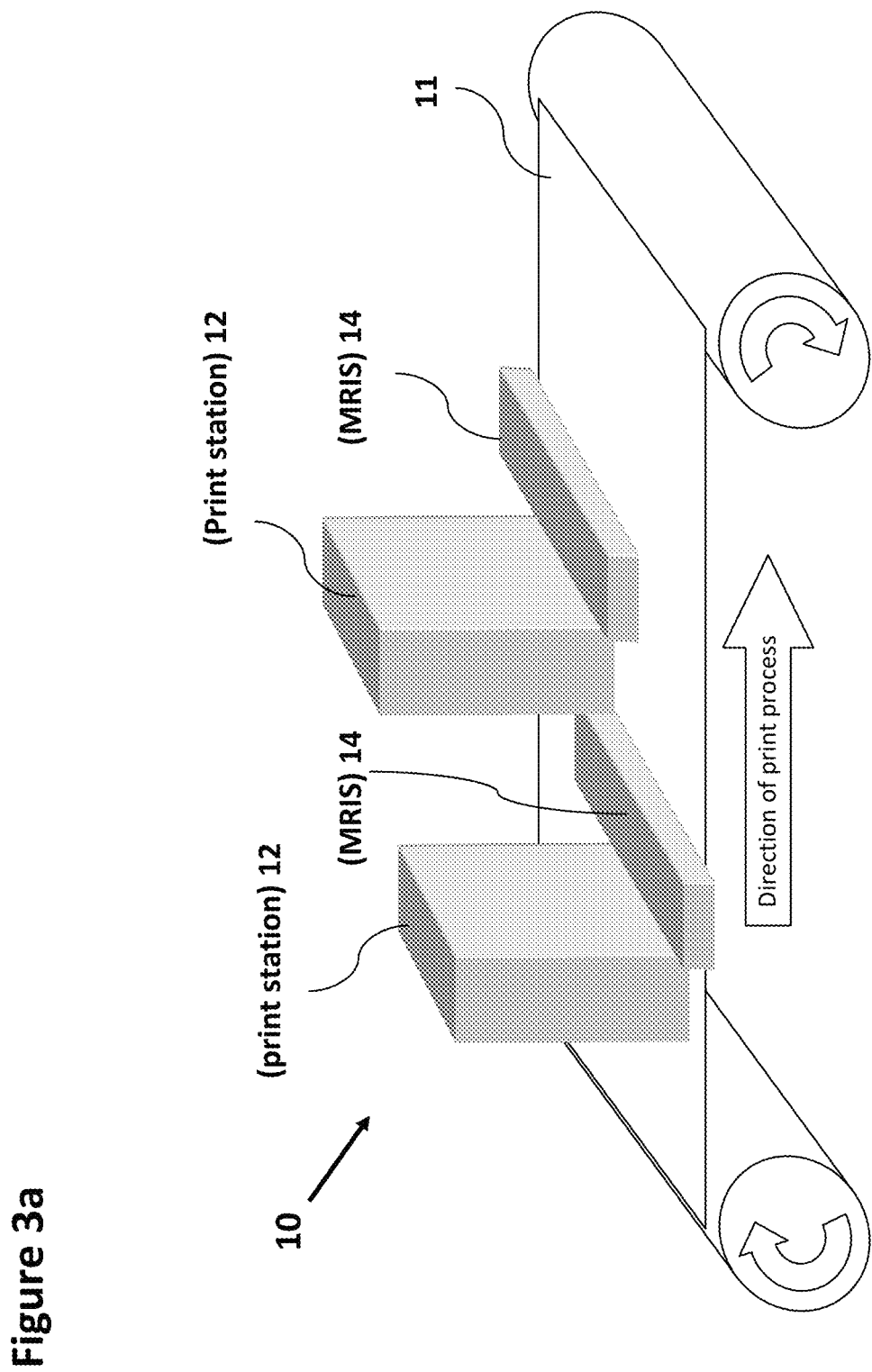
FIG. 3a is a schematic view of a multi-resolution segmented image sensor (MRIS) in a print system with a two print stations arranged side-to-side to cover a total printing width of two print station widths. The MRIS for each print station is in close proximity to the print station according to the preferred implementation of this invention.

The analogous configuration of a wide-format print system is shown in FIGS. 3a and 3b. A schematic arrangement of two print stations side-to-side is shown in FIG. 3a. A print media of twice the width of a single print station is printed on in this arrangement. A planar view of the print elements in both print stations with respect to the sensor arrays in both MRIS-sensors is shown in FIG. 3b. Each of the linear sensors or MRIS units can inspect the print of the upstream print station. The MRIS for each print station provide all the inspection functions for the corresponding print station including the monitoring of the stitch locations of the print elements in the print station with high-resolution sensor arrays. In addition, the high-resolution sensor arrays 23 of the downstream MRIS allows monitoring of the stitch and registration quality during the printing process by evaluating test patterns that are placed in the stitch area 22 between two adjacent print stations approximately located in the center of the wide print media.

As the printed receiver is moved past both MRIS units 14, image features in the overlap region of the two MRIS units that are detected by both MRIS units can be analyzed to determine the spatial relationship between the MRIS units. Once this analysis is complete the image processor that receives the image data from both MRIS units can stitch the image data together to form a composite image that spans the entire width of the wide format print media.

In one embodiment, the MRIS is comprised of a segmented array of charged-couple devices (CCDs) 20 or complementary metal-oxide semiconductor (CMOS) sensors, shown in planar view in FIG. 2b, that have varying native resolution and are arranged on a common substrate. Electronic data from the MRIS are sent to the sensor controller and signal processor 18, shown in FIG. 1, which relays the processed data to a system controller 19 which utilizes the data for performing print element adjustments, image display of the printed image and display of information about the print process (e.g. notifications or alarms) to the operator.

Figure 4:
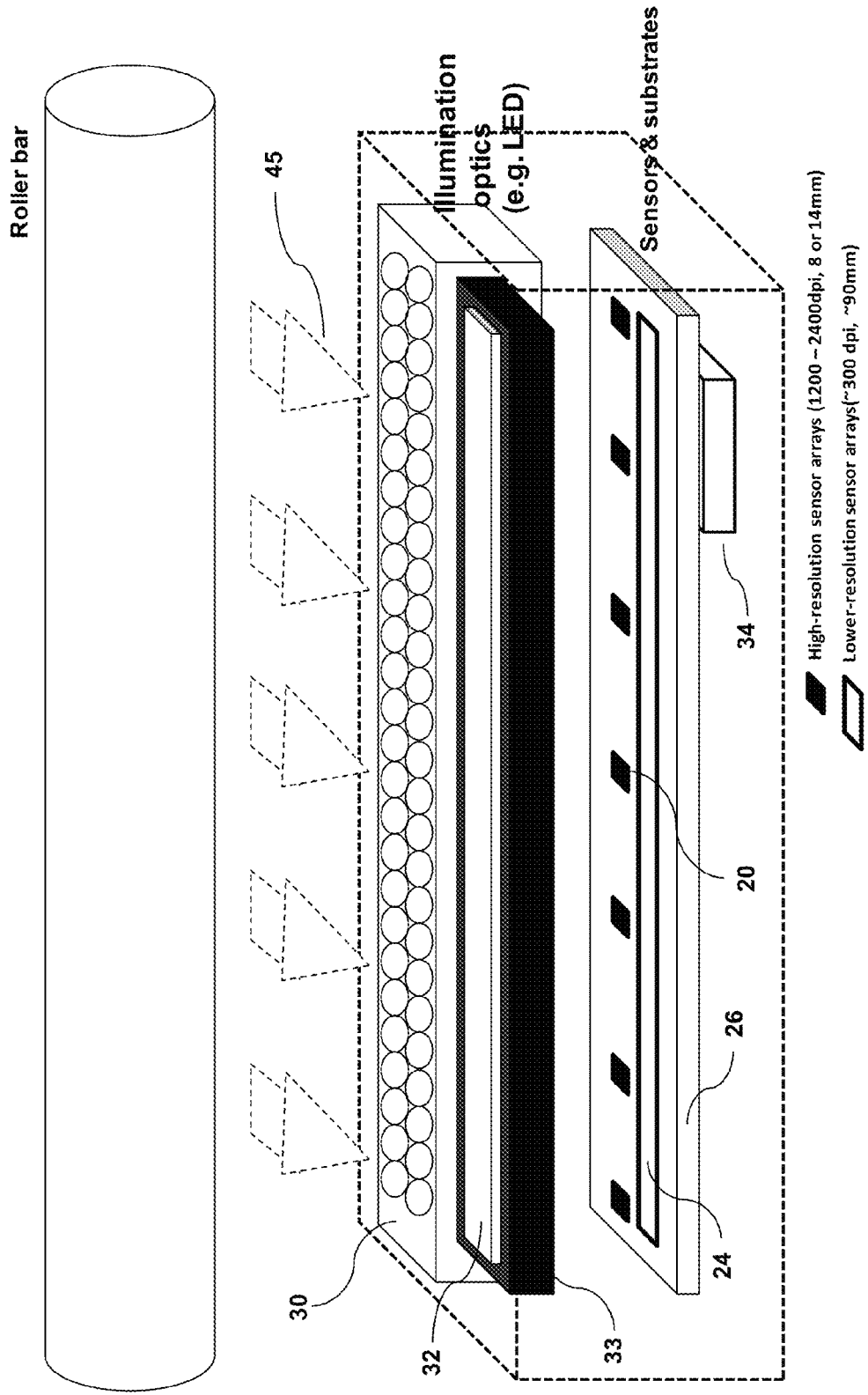
FIG. 4 is a schematic view of a multi-resolution image sensor (MRIS) according to the present invention with an integrated target illumination and a single lens array.
Figure 5:
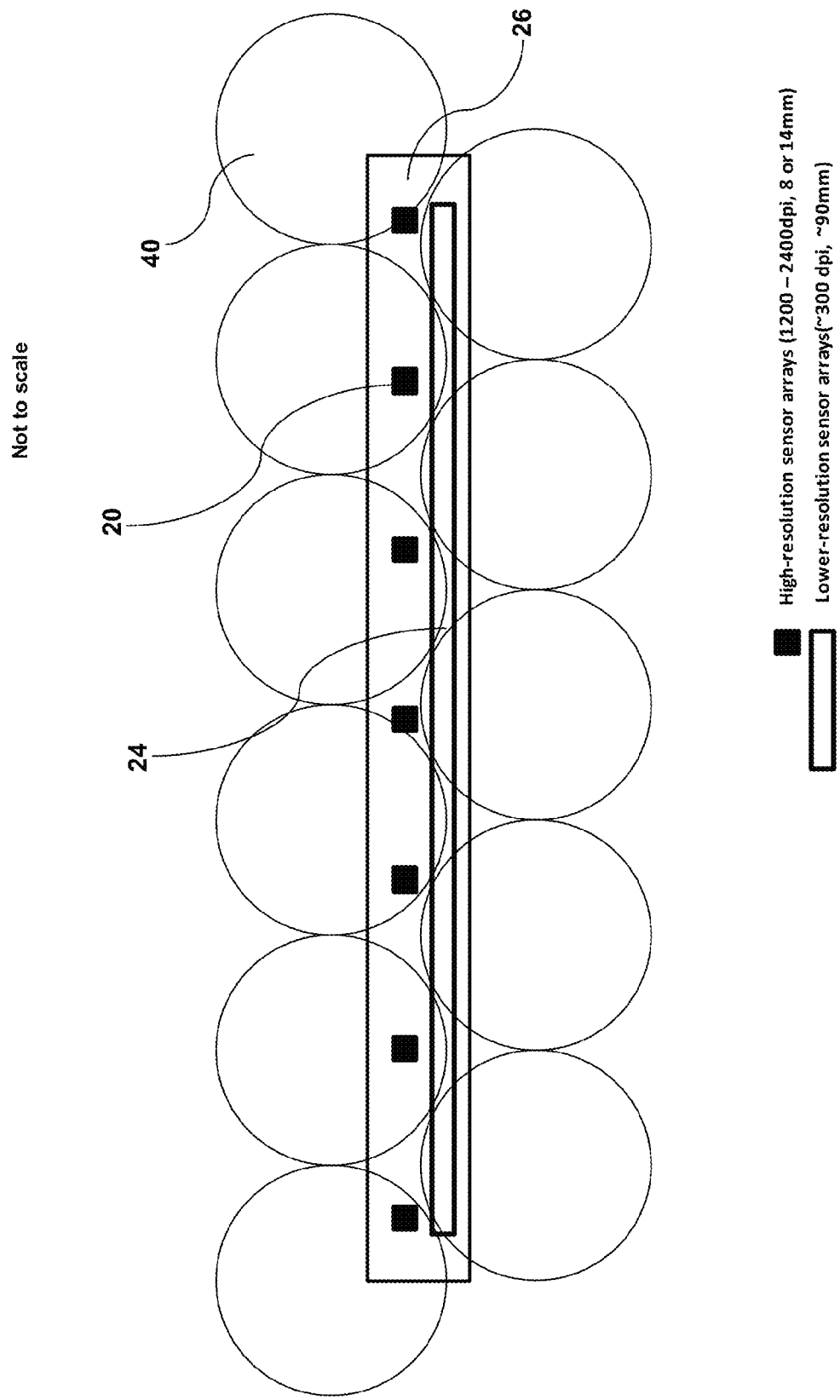
FIG. 5 is a planar view, partially in phantom, of the present invention with a lens array.

FIG. 2b depicts an arrangement wherein high spatial resolution scanning elements 20 form a CCD array 23 (e.g. 1200 dpi) and are linearly arranged in a non-contiguous manner at the print module stitch locations 22 and at both ends of the print station. FIG. 2b also shows a contiguous linear arrangement of lower spatial resolution CCD sensors (e.g. 300 dpi) 24 that are in close proximity and arranged parallel to the non-contiguous, high-resolution CCD arrays 20. The arrangement of the lower-resolution CCD arrays is such that the pitch between adjacent elements is constant (e.g. 84.67 microns for 300 dpi). This pitch is maintained across adjacent CCD arrays such that all elements along the active length of the arrays appear at the same resolution with minimal linearity error in the x, y and z directions. In the preferred embodiment, the CCD arrays are bonded using known die-bonding techniques, to a common substrate material 26 as shown in FIG. 4 and FIG. 5 (e.g. ceramic or FR4 printed circuit board material) containing electrical traces and interconnects. The substrate material can be ceramic or a dimensionally stable fiberglass printed-circuit-board substrate material (e.g. FR-4). Appropriate wirebonding techniques can be used to connect the CCD sensors to the conductive traces on the substrate, which in turn connect to the CCD driving circuitry and signal-processing electronics. A CMOS array would also be appropriate. By comparing the image data from the high-resolution sensor arrays with image data from the low-resolution sensor array, it is possible to determine the spatial relationship between the high-resolution sensor array segments and the low-resolution sensor array. This allows the spatial relationship between the segments of the high-resolution sensor to be determined as well.

FIG. 4 is a schematic of a multi-resolution segmented image sensor according to the present invention. The use of Selfoc™ gradient-index lens array 30 in the optical design of linear CCD sensors is well known in the scanner industry (e.g. industrial contact-image sensor (CIS) technology). A common line-illumination source 32 is also positioned to allow for sufficient and uniform target illumination along a scan line within the field of view of the CCD sensors. The line-illumination source can be monochromatic or RGB and implemented with LEDs, laser diodes or similar technologies. The system controller generates a strobe timing to allow for activation of various light sources at appropriate time. The target illumination is designed to provide uniform illumination of the target area imaged by the low-resolution and high-resolution arrays of the MRIS. A light shield 33 located between the light source and the low- and high-resolution array(s) is provided to prevent direct illumination of the linear sensor arrays by the light source. The light shield prevents stray light from affecting the quality of the imaged target area. In the schematic view of FIG. 4, the light source of the illumination is encapsulated in a light shield shielding all elements of the MRIS from direct light from the light source. The signal processing and electronic interface circuits 18 are used to control the sensor data and relay the acquisition timing from the sensor to the system controller 19. In one embodiment, the signal processing and electronic interface circuits 18 are compliant with standard camera sensor interface protocols such as CameraLink.

FIG. 5 is a schematic top view of the present invention with a Selfoc™ lens array 30 consisting of individual gradient-index glass rods 40. The separation between the two rows of CCDs is consistent with the field-of-view of the imaging optics such that both rows of sensor arrays can be imaged adequately with a common optics such as a Selfoc™ lens array 30 made by Nippon Sheet Glass (NSG). The Selfoc™ lens array 30 has a plurality of gradient-index glass rods 40 that are packed and arranged to produce a compact lens that can image the linear arrangement of CCD arrays in a 1:1 magnification ratio with a fixed working distance from the lens to the image plane. Since the cleanliness of the imaging optics is critically important to the error free detection of the specially designed marks for stitching and registration, a source of air 45 is provided to force air to flow across the imaging optics between the MRIS 14 and the print media 11 is incorporated into the printing system as shown in FIG. 7. The source of air 45 can be incorporated into the MRIS unit 14 or it can be separate component. Air source 45 for the forced airflow to protect the imaging optics from contamination can include a blower and a manifold for directing the flow or air from the blower across the optical element of the linear sensor to remove contaminates from the optical element. The source for the air flow is typically provided with clean or filtered air. The air source controls the air flow in direction, velocity and volume across the imaging optics so that contamination of the imaging optics is reduced or eliminated.

Figure 6:
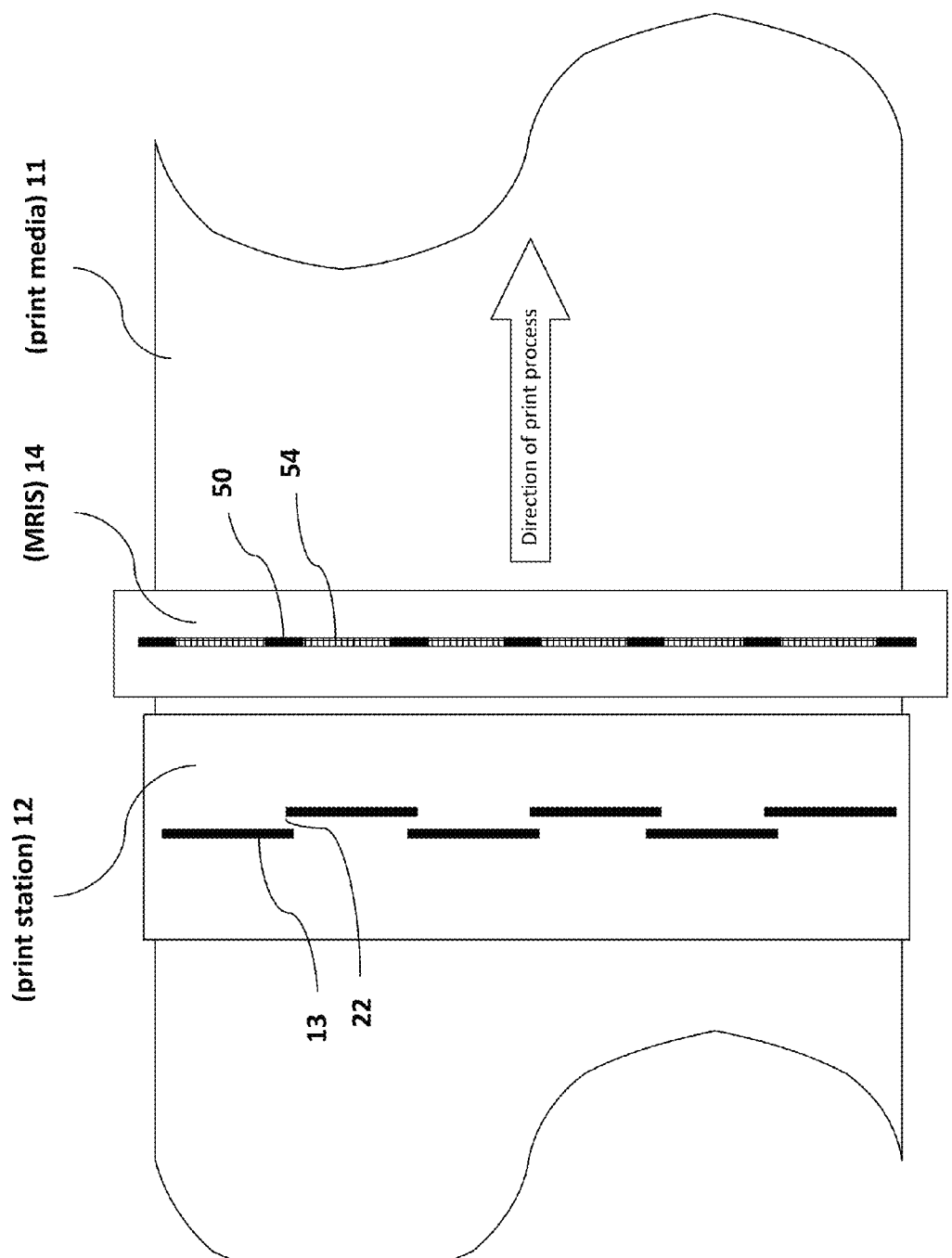
FIG. 6 is a planar view of the present invention showing an inline sensor array.

In another embodiment, shown in FIG. 6, the higher 50 and lower 54 resolution arrays are arranged in a single, inline or collinear configuration on a common substrate 26. The higher-resolution sensor arrays 50 are positioned at the stitch locations 22 of the print elements 13, but in a contiguous arrangement with the lower-resolution arrays.

Figure 7A:
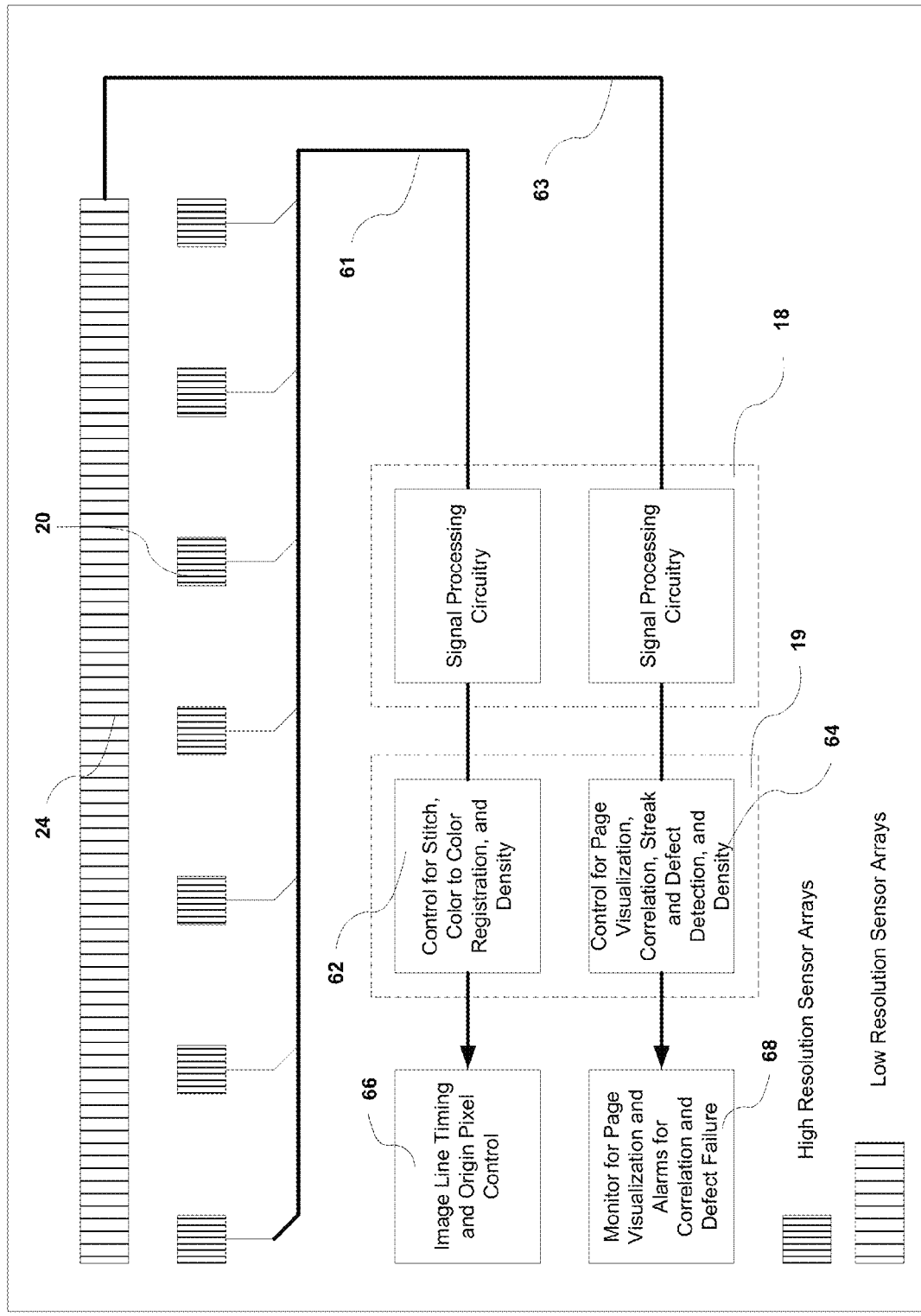
FIG. 7a is a schematic showing the data flow arrangement with respect to the multi-resolution image sensor with the low-resolution sensor array offset from the high-resolution sensor arrays.
Figure 7B:
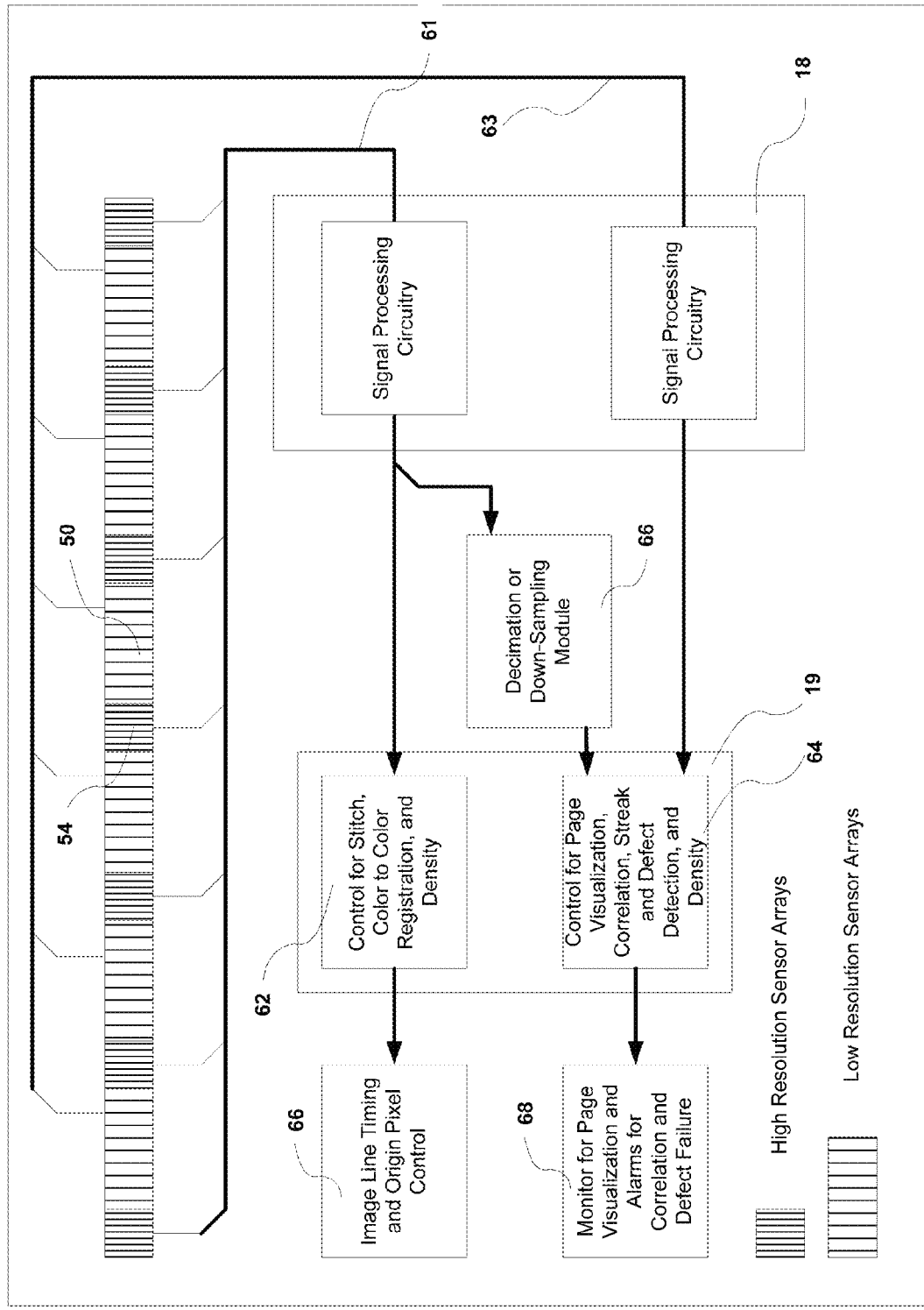
FIG. 7b is a schematic showing the data flow arrangement with respect to the multi-resolution image sensor with the high-resolution sensor arrays positioned in-line with the low-resolution sensor arrays.

As shown in FIG. 7a, each row of CCD arrays has a separate output channel that may also be segmented into multiple channels (61, 63) depending on the required bandwidth needed for the image-acquisition process. The output of high-resolution sensor arrays 23 passing through channel 61, while the output of the low-resolution sensor array passing through channel 63. The CCD output channels are load-balanced to allow similar data-acquisition rates for each channel. The higher-resolution array channel 61 minimizes the data bandwidth by not having contiguous arrays along the entire imaging width. Conversely, the lower-resolution arrays provide continuous coverage, but also minimize data bandwidth requirements on channel 63 by having fewer pixels per unit length than the higher-resolution arrays. The multiple CCD output channels enable simultaneous scanning at full speed of both the higher-resolution arrays and the lower resolution arrays. FIG. 7b shows an alternative configuration where the high-resolution and low-resolution sensor arrays are positioned in an inline or collinear fashion. The data channels are still arranged as the previous configuration shown in FIG. 7a.

The output from the CCD output channels are sent to signal processing and electronic interface circuits 18 shown in FIG. 1 and also FIGS. 7a and 7b. The signal processing and electronic interface circuits 18 are composed of blocks 62, 64, 66 and 68 in FIG. 7a and blocks 62, 64, 66, 68 and 69 in FIG. 7b and provide A/D conversion, combine and manipulate the data in each channel such that the output from the signal processing block is usable image data for image analysis and/or display.

In the inline configuration of the higher and lower resolution arrays, appropriate signal processing 69, shown in FIG. 7b, is used to extract a lower-resolution image segment from the higher-resolution arrays and merging or concatenating these image segments into the image data from the lower-resolution sensor arrays of the corresponding MRIS, linear sensor. In this manner a low resolution continuous image is formed spanning the print or page width.

The system controller 19, shown in FIG. 1, contains the functions needed for control for stitch and color-to-color registration and density control 62, control for page visualization, page correlation, and streak and defect detection and density control 64, image line timing and origin pixel control 66. The controller 19 also has a monitor 68 for page visualization and a graphical display of alarms in the case of correlation and defect failures and deviation from aim density.

Figure 8:
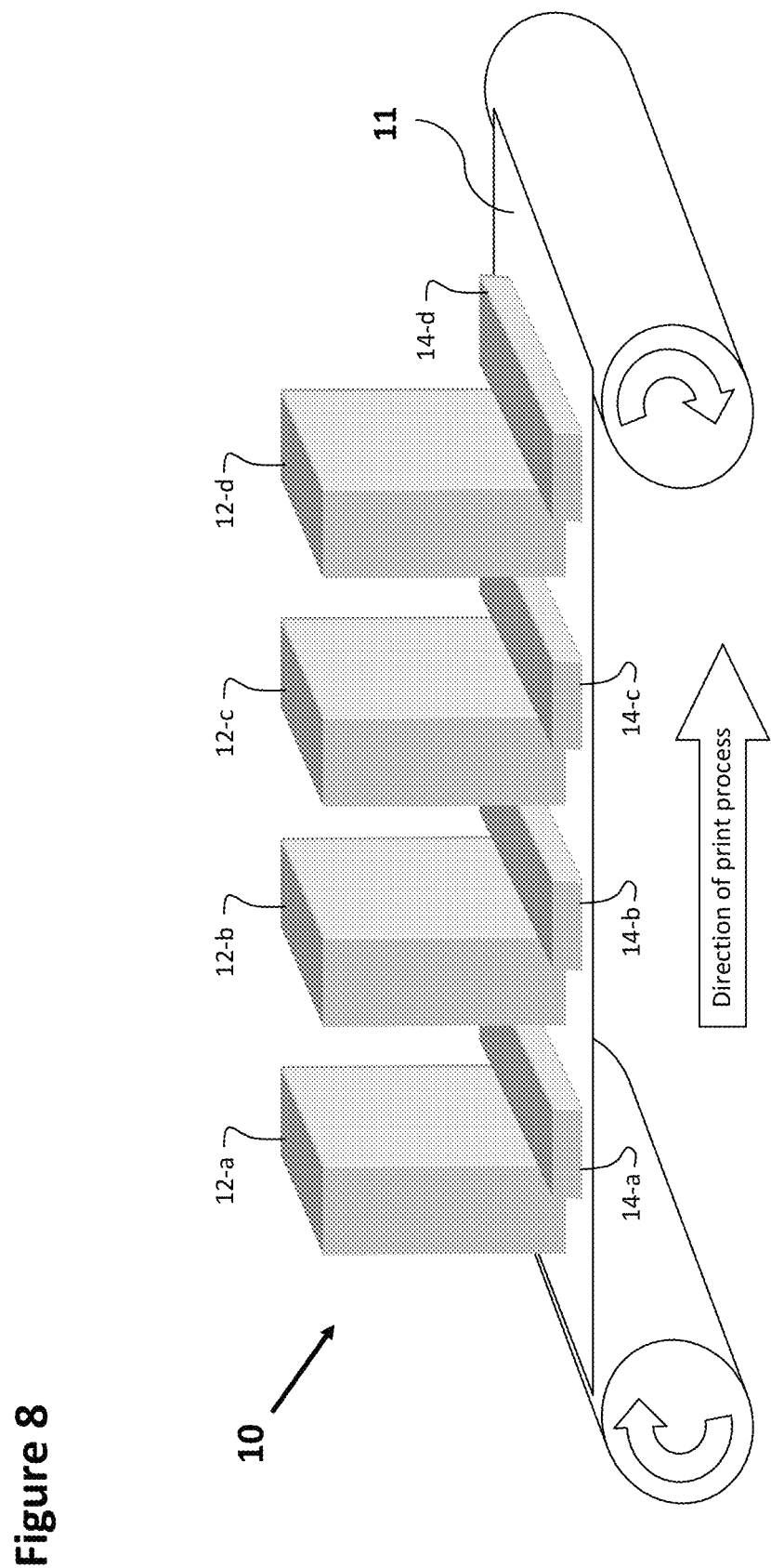
FIG. 8 is a schematic view of a color print system with four print stations. Each of the print station is paired with a MRIS.
Figure 9:
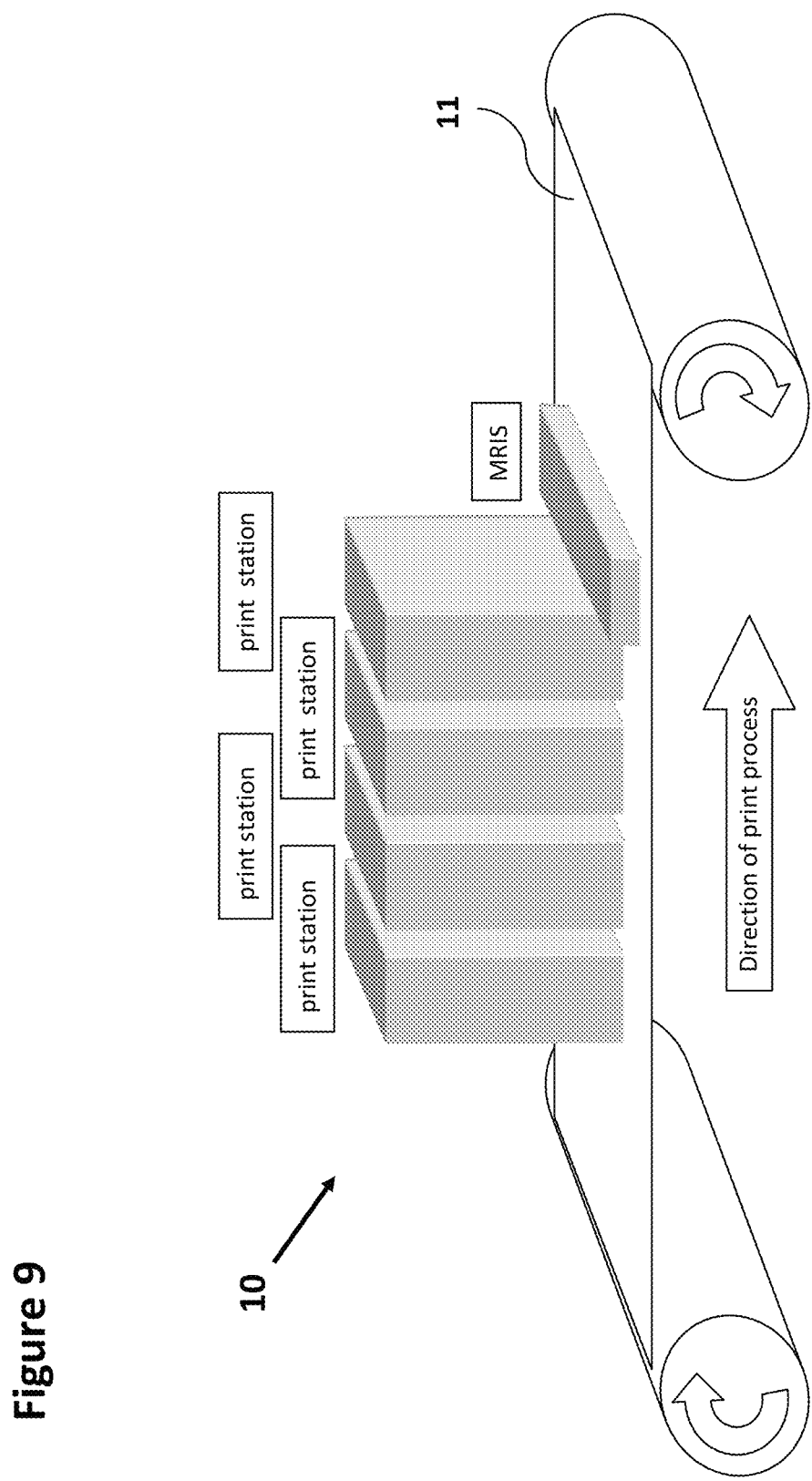
FIG. 9 is a schematic view of a color print system with four print stations. Only the last of the print station is paired with a MRIS.

The functions of the multi-resolution segmented image sensor (MRIS) and advantages have been explained in context of a print system with a single print station (as shown schematically in FIG. 1). The extension of this disclosure to a four color ink jet printer is schematically shown in FIG. 8. In this embodiment, an MRIS 14 is mounted downstream of each of the four print stations 12. It is apparent, that the separation of data streams in low- and high-resolution channels 61, 63 according to the spatial resolution of the imaging sensor is still of the advantage provided by the integrated sensor solution of the MRIS. Depending on the design, layout and size of the four color printer, a single MRIS following the last of the four print stations (shown in FIG. 9) could take on all three applications for all four print stations without compromise to the quality in the execution of the applications. In this case and for the first application, the system controller 19 sequentially lines up the jetting modules for each print station to measure and adjust the print timing and overlap pixel locations for optimal printing. For the second application and during the printing process, the high-resolution arrays within the MRIS measure the registration targets at each location and provide positional information for each color plane to the controller for adjustment of the individual colors of the print station the MRIS is paired with. The third and fourth application according to this disclosure requires the capture of the entire image with a color-sensitive method. This is either accomplished with a linear, color sensitive low-resolution array in the MRIS or a monochrome array in the MRIS that is capturing the output image under red, green and blue illumination flashed in rapid succession.

It is recognized that commercial printing equipment is rather large and often a web-based system and the individual image writers or print stations might be separated by rather large distance of 15 feet (5 meter) or more along the media path. For such large printing devices, control functions will be limited in their response time by the size of the printing equipment by the time needed for the receiver to move from an individual print station 12 (such as the first print station on the left) to the downstream MRIS unit 14 on the right. For such large equipment, it is desirable to integrate control functions into the individual printing stations for fastest response. The pairing of one MRIS with each print station as shown in FIG. 8 will satisfy this design need. Referring to FIG. 8, it is apparent that the second MRIS mounted downstream of the second print station will have high-resolution images of the stitch area of the first and the second print station. This MRIS is also able to measure the registration of the first and the second print station and through the controller adjust the placement of the images printed by either one of the upstream print stations using the full amount of the measured placement error or the placement of the images printed by both of the print stations simultaneously by using half of the measured placement errors with opposite direction. The low-resolution sensor array in this second MRIS will be able to detect defects such as streaks, or other unintended density nonuniformity within a page, or missing lines of data in the first two colors. However, in a four-color print system the low-resolution array in this second MRIS will only have a partially colored image with the first two of four colors.

In the embodiment shown in FIG. 8, the high-speed multi-color, or multiple image plane, printing system 10 includes a first print station 12-a that prints a first image plane on the receiver. The first print station includes a plurality of print elements each of which prints a swath of the printed image. A first linear sensor, also called a multi-resolution image sensor (MRIS), 14-a which includes at least one first high-resolution sensor array 23 and at least one first low resolution sensor array 24 for capturing images of the image printed by the first print station 12-a. The output of the high-resolution sensor array of the first linear sensor is transmitted to the controller 19. Using this information, the controller calculates a stitch correction for enabling the swaths of print of the plurality of print elements to be stitched together. The high-speed multi-color, or multiple image plane, printing system 10 includes a second print station 12-b that prints a second image plane on the receiver. The second print station includes a plurality of print elements each of which prints a swath of the printed image. A second linear sensor, also called a multi-resolution image sensor (MRIS), 14-b which includes at least one first high-resolution sensor array 20 and at least one first low resolution sensor array 24 for capturing images of the image printed by the second print station 12. The output of the high-resolution sensor array of the second linear sensor is transmitted to the controller 19. Using this information, the controller calculates a stitch correction for enabling the swaths of print of the plurality of print elements of the second print station to be stitched together.

The controller using the calculated stitching corrections for the first and second image planes, adjusts the placement of the swaths or image plane segments printed by the individual print elements of the print stations so that the image plane segments properly stitch together. The adjustment of the placement of the swaths can include adjusting the timing of the image data provided to the corresponding print station.

The low resolution sensor array one or both of the first and second linear sensors is also used to capture an image. The captured image of at least one of the first and second low resolution sensor array spans the width of the printed image. Preferably the captured image of at least one of the first and second low resolution sensor array spans the width of the receiver or print media, so that an edge of the print media can be detected using at least one of the low resolution sensor array and the high-resolution sensor array.

In certain embodiments, the high-speed multi-color, or multiple image plane, printing system 10 includes a third print station 12-c that prints a third image plane on the receiver. The third print station includes a plurality of print elements each of which prints a swath of the printed image. A third linear sensor, also called a multi-resolution image sensor (MRIS), 14-c which includes at least one first high-resolution sensor array 23 and at least one first low resolution sensor array 24 for capturing images of the image printed by the third print station 12-c. The output of the high-resolution sensor array of the second linear sensor is transmitted to the controller 19. Using this information, the controller calculates a stitch correction for enabling the swaths of print of the plurality of print elements of the third print station to be stitched together.

In certain embodiments, at least one of the linear sensors is used to capture images of a plurality of image planes, each of the image planes including registration marks. The linear sensor preferably has a high-resolution sensor array aligned in the crosstrack direction with the printed registration marks, such that the high-resolution sensor can detect the registration marks on the print media. The controller uses the detected locations of the registration marks to determine a registration correction value, and uses the determined registration correction value to adjust the placement of at least one of the image planes to properly register the image planes relative to each other.

Figure 10:
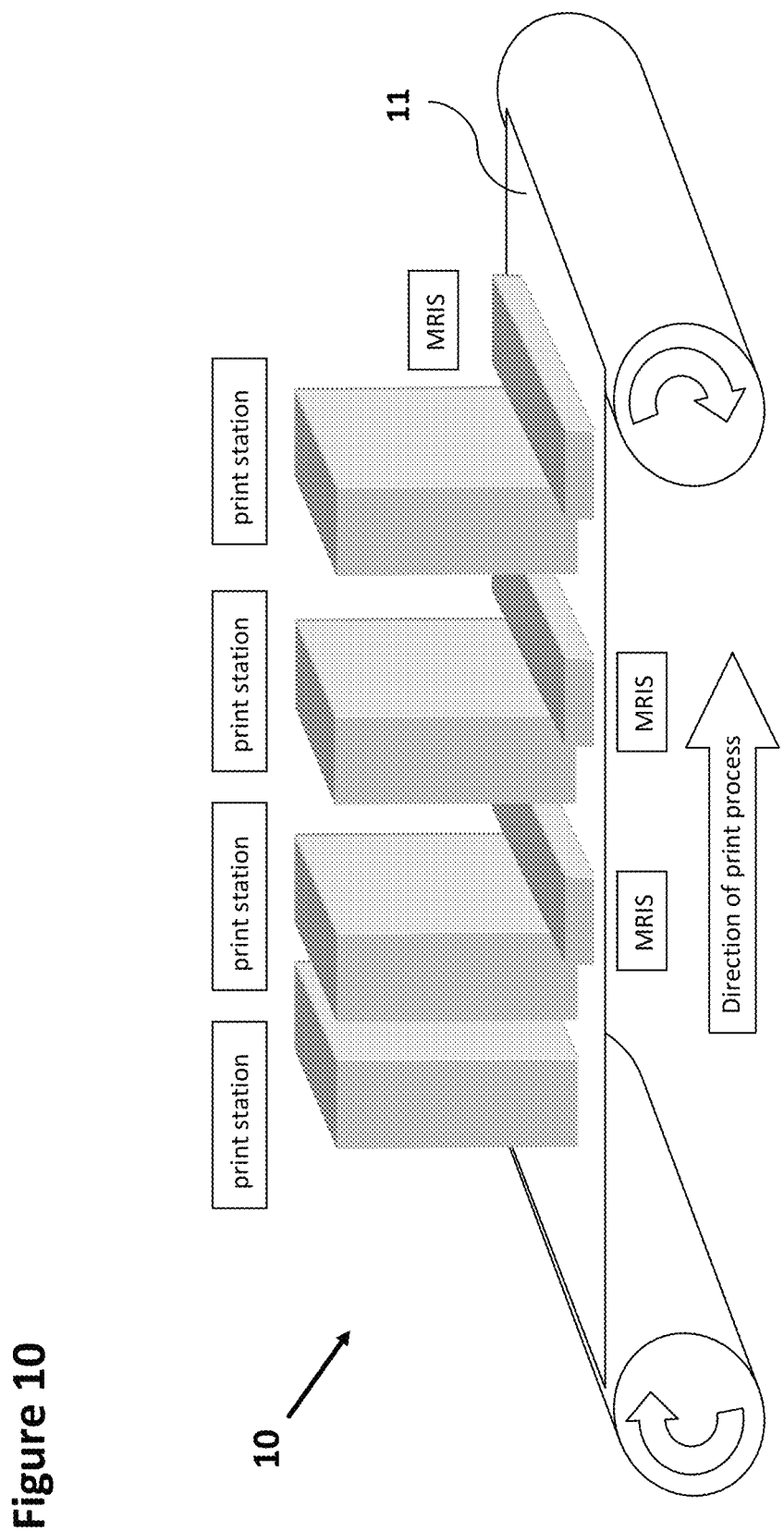
FIG. 10 is a schematic view of a color print system with four print stations. Only the last three of four print stations are paired with a MRIS.
Figure 11:
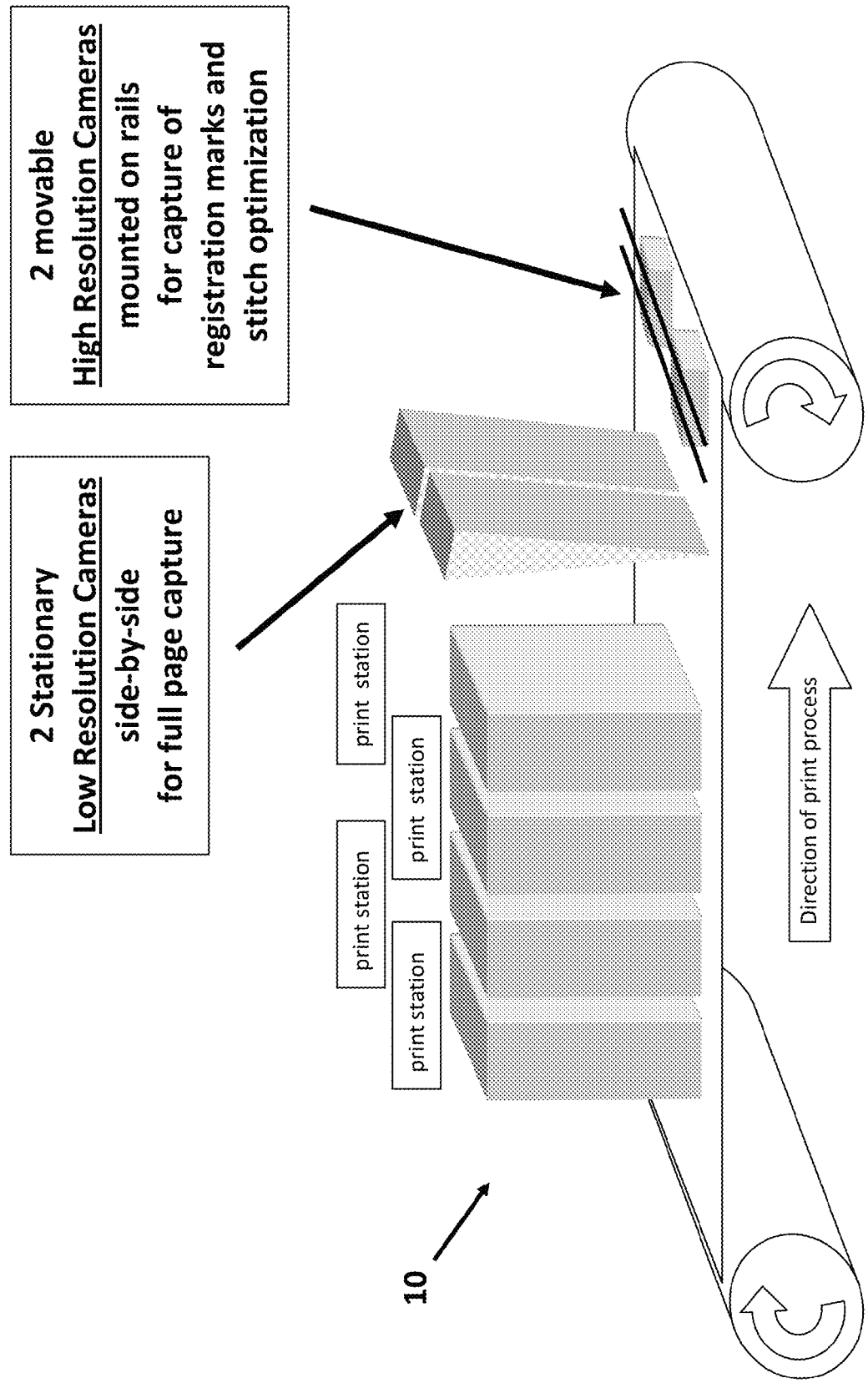
FIG. 11 is a schematic view of a color print system with four print stations according to the prior art. According to prior art, two separate visions systems are used to provide a low-resolution image of the full output page and a high-resolution system to image registration marks and optimize the stitching in various locations.

In view of the sequential printing process, the preferred placement and number of MRIS placed in a multi-print station printing process is one less than there are print stations with little loss of quality. The arrangement is schematically shown in FIG. 10. Only the MRIS on the last print station is able to capture the complete image composed of all colors and should be selected with a color-sensitive low-resolution array. Since the MRIS according to the preferred implementation of this invention includes a high-resolution array at either end of the device, a larger printing width can be configured similarly by side-to-side arrangement of two or more print stations (as schematically shown in FIG. 3a).

Figure 12A:
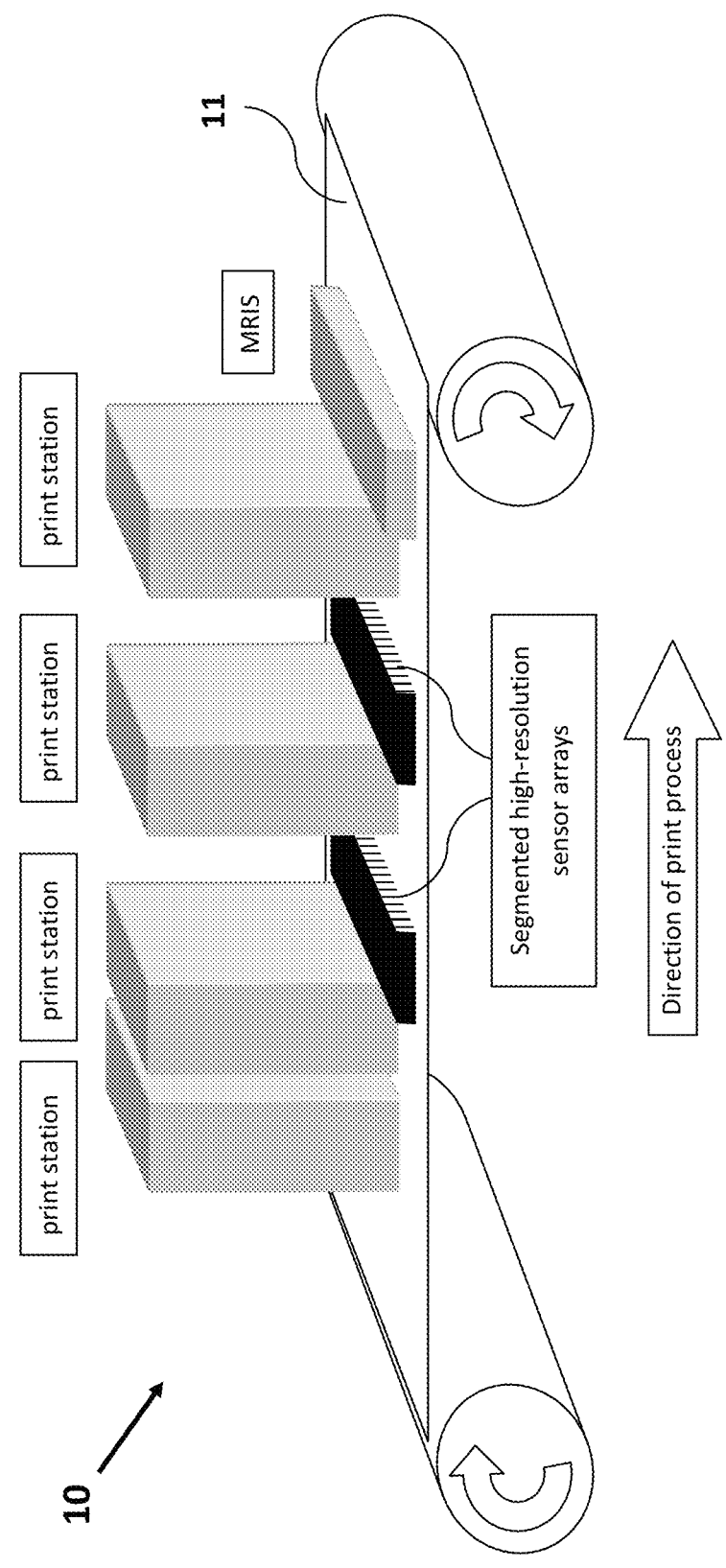
FIG. 12a is a schematic view of a linear low-resolution array after only the last print stations.
Figure 12B:
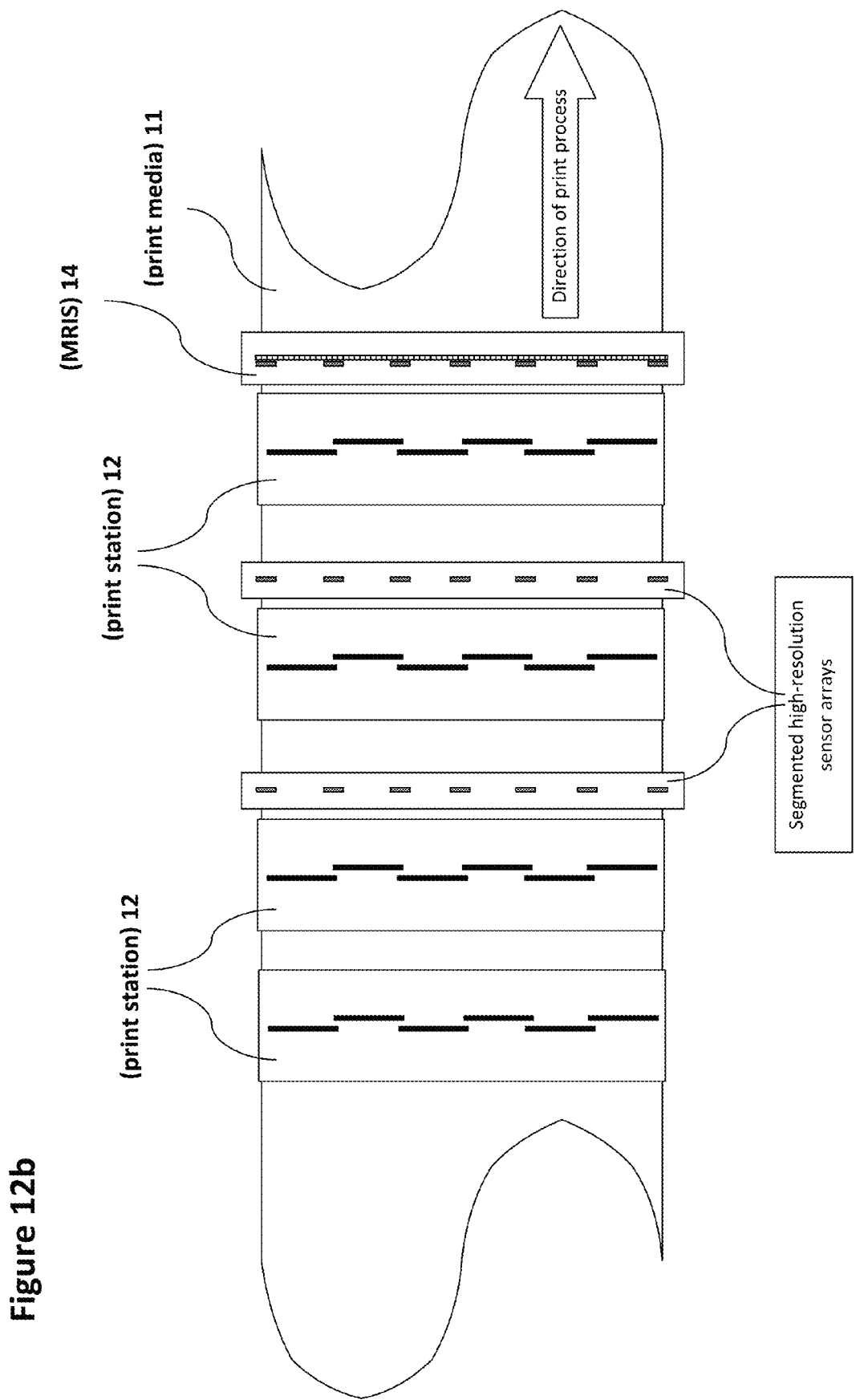
FIG. 12b is a planar view of the print system shown in FIG. 12a illustrating the arrangement of segmented high-resolution sensor arrays and one low-resolution sensor array positions only after the last print station.

In print systems where the lateral movement of the support perpendicular to the process direction is well controlled, a low-resolution sensor array for full-width viewing of the output might only be mounted after the last print station. Except for the first print station the other print stations might be paired with a segmented high-resolution sensor array only to provide stitch and registration control data to the controller of the printing process. Such installation might lower the cost of the sensors and the complexity of the controller without compromising the quality of the printed output. FIG. 12a shows the schematic view of such print system. For this print system, FIG. 12b illustrates in planar view the locations of the high-resolution and low-resolution senor arrays with respect to print stations.

The invention has been described in detail with particular reference to certain preferred embodiments thereof, but it will be understood that variations and modifications can be effected within the scope of the invention.

PARTS LIST 10 printing system
11 print media
12 print station (e.g. ink module or LED-writer)
12-a first print station
12-b second print station
12-c third print station
12-d fourth print station
13 print element
14 multi-resolution image sensor (MRIS)
14-a first MRIS
14-b second MRIS
14-c third MRIS
14-d fourth MRIS
16 output print
18 signal processing and electronic interface circuits 19 system controller
20 high-resolution sensing element (CCD array)
22 print element stitch location(s)
23 high-resolution sensor array
24 low-resolution CCD sensing array(s)
26 substrate material
30 gradient-index lens array
32 target illumination light source
33 light shield
40 gradient-index glass rods (of a lens array in top view)
45 air source
50 high-resolution sensing array(s)
54 low-resolution sensing array(s)
61 data channel for high-resolution array(s)
62 control for stitch and color-to-color registration function block
63 data channel for low-resolution array(s)
64 control for page visualization, correlation and streak and defect detection and density control function block
66 image line timing and origin pixel control and density control function block
68 monitor for page visualization and alarms
69 decimation or down-sampling module function block

The invention claimed is:

1. A system for high-speed multi-color printing comprising:
   a first print station having a plurality of print elements each of which prints a first swath on a print media that prints a first image plane;
   wherein first adjacent swaths are stitched together at stitch locations;
   a first linear sensor having at least two first high-resolution sensor arrays aligned with the stitch locations and at least one first low-resolution sensor array;
   wherein the two first high-resolution sensor arrays are non-continuous;
   transmitting an output of the two first high-resolution sensor arrays to a controller;
   wherein the controller calculates a stitch correction based on a first high-resolution image for the first print station;
   wherein the controller, based on the calculated correction, adjusts at least one of a timing or a selection of print elements of image data and provided to printing dots on the first print station to align an output of the printed dots;
   a second print station having a plurality of print elements each of which prints a second swath on the print media that prints a second image plane;
   wherein second adjacent swaths are stitched together at the stitch locations;
   a second linear sensor having at least two second high-resolution sensor arrays aligned with the stitch locations of the second print station and at least one second low-resolution sensor array;
   wherein the two second high-resolution sensor arrays are non-continuous;
   transmitting an output of the two second high-resolution sensor arrays to the controller;
   wherein the controller calculates a second image plane stitch correction based on the second high-resolution image for the second print station; and
   wherein the controller, based on the calculated correction, adjusts at least one of a timing or a selection of the print elements of image data provided to printing dots on the second print station to align an output of the printed dots.

2. The system of claim 1 wherein the at least one of the one first or the one second low resolution sensor arrays provides full page viewing.

3. The system of claim 1 wherein at least one of the linear sensors spans width of the print media.

4. The system of claim 1 wherein at least one of the low-resolution sensor arrays is comprised of non-continuous segments.

5. The system of claim 1 further comprising;
   a third print station having a plurality of print elements each of which prints a third swath on the print media that prints a third image plane;
   wherein third adjacent swaths are stitched together at the stitch locations;
   a third high-resolution sensor array, having at least two high-resolution arrays aligned with the stitch locations;
   wherein the two third high-resolution sensor arrays are non-continuous;
   transmitting an output of the third high-resolution sensor arrays to the controller;
   wherein the controller calculates the third image plane stitch correction based on the third high-resolution image for the third print station;
   wherein the controller, based on the calculated third image stitch correction, adjusts at least one of a timing or a selection of print elements of image data provided to printing dots on the third print station to align an output of the printed dots.

6. The system of claim 1 wherein the two first high-resolution sensor arrays and the one first low resolution sensor arrays are in a collinear arrangement.

7. The system of claim 1 wherein the two first high-resolution sensor arrays are parallel and in close proximity to the one first low-resolution sensor arrays which is a full width of a media.

8. The system of claim 1 wherein at least one of the one first low-resolution sensor arrays or the two first high-resolution sensor arrays detects an edge of a media.

9. The system of claim 1 wherein both the first and the second image planes including registration marks, and the high-resolution sensor array of one of the first and the second sensors detects the registration marks on a media and controller uses detected locations of the registration marks to determine a registration correction value, and uses the determined registration correction value to adjust, the placement of at least one of the image planes to properly register the image planes relative to each other.

10. The system of claim 1 wherein the one first or the one second low-resolution sensor array detects image artifacts.

11. The system of claim 1 wherein the controller compares data from the at least one first or the one second low-resolution sensor array and the at least two first or the two second high-resolution sensor array and determines a spatial relation between the compared data.

12. The system of claim 1 wherein a first light source illuminates a field of view for both the two first high-resolution sensor arrays and the one first low-resolution sensor array.

13. The system of claim 12 wherein the first light source is integrated in the first linear sensor.

14. The system of claim 1 wherein a shield prevents direct illumination of both the two first or the two second high-resolution and the one first or the one second low-resolution sensor arrays.

15. The system of claim 1 wherein a first optical element images a field of view onto both the two first high-resolution sensor array and the one first low-resolution sensor array.

16. The system of claim 15 wherein the first optical element is integrated in the first linear sensor.

17. The system of claim 16 wherein air blows across the first optical element.

18. The system of claim 1 wherein the two first and the two second high-resolution sensor array and the one first and the one second low-resolution sensor array are bonded to a substrate that translates in a cross-track direction for alignment.

19. The system of claim 1 wherein the first print station is an inkjet module.

20. The system of claim 1 wherein:
the output of one of the two first and the two second high-resolution sensor arrays is processed to extract a lower resolution image segment; and
the extracted image segment being merged with the output of the corresponding one of the two first and the two second low-resolution sensor arrays to form a low resolution image spanning the page width.

21. The system of claim 1 wherein the first print station is an electrophotographic module.

22. The system of claim 1 wherein the at least two first and second high resolution sensor arrays each having a first pitch of sensing elements and the at least two one first and second low resolution sensor arrays have a second pitch of sensing elements, wherein the second pitch of the sensing elements of the two one first and second low resolution sensor arrays are larger than the first pitch of the sensing elements of the two first and the two second high resolution sensor arrays.

23. A system for high-speed multi-color printing comprising:
a first print station having a plurality of print elements each of which prints a first swath on a print media that prints a first image plane;
wherein first adjacent swaths are stitched together at stitch locations;
a first high-resolution sensor having at least two first high-resolution sensor arrays aligned with the stitch locations;
wherein the two first high-resolution sensor arrays are non-continuous;
transmitting a first high-resolution image from the two first high-resolution sensor arrays to a controller;
wherein the controller calculates a stitch correction based on the first high-resolution image;
wherein the controller, based on the calculated first image plane stitch correction, adjusts at least one of a timing or a selection of print elements of image data and provided to printing dots on the first print station based on the calculated correction to align an output of the printed dots on the first print station;
a second print station having a plurality of print elements each of which prints a second swath on the print media that prints a second image plane;
wherein second adjacent swaths are stitched together at the stitch locations;
a second high-resolution sensor having at least two second high-resolution sensor arrays aligned with the stitch locations;
wherein the two second high-resolution sensor arrays are non-continuous;
transmitting a second high-resolution image from the two second high-resolution sensor arrays to the controller;
wherein the controller calculates a second image plane stitch correction based on the second high-resolution image; and
wherein the controller, based on the calculated the second image plane stitch correction, adjusts at least one of a timing or a selection of the print elements of image data provided to printing dots on the second print station based on the calculated second image plane stitch correction to align an output of the printed dots on the second print station;
a third print station having a plurality of print elements each of which prints a third swath on the print media that prints a third image plane;
wherein third adjacent swaths are stitched together at the stitch locations;
a third linear sensor array, has high-resolution arrays and low resolution sensors;
wherein the wherein the high-resolution sensor, having at least two third high-resolution sensor arrays aligned with the stitch locations of the third print station;
wherein the two third high-resolution sensor arrays are non-continuous;
transmitting an output of the two third high-resolution sensor arrays to the controller;
wherein the controller calculates a third image plane stitch correction based on third high-resolution image for the third print station; and
wherein the controller, based on the calculated third image plane stitch correction, adjusts at least one of a timing or a selection of print elements of image data provided to printing dots on the third print station based on the calculated third image plane stitch correction to align an output of the printed dots on the third print station.

24. A system for high-speed multi-color printing comprising:
a first print station having a plurality of print elements each of which prints a first swath on a print media that prints a first image plane;
wherein first adjacent swaths are stitched together at stitch locations;
a first high-resolution sensor array having at least two first high-resolution sensor arrays aligned with the stitch locations;
wherein the two first high-resolution sensor arrays are non-continuous;
transmitting a first high-resolution image from the two first high-resolution sensor arrays to a controller;
wherein the controller calculates a stitch correction based on the first high-resolution image;
adjusting at least one of a timing or a selection of print elements of image data and provided to printing dots on the first print station based on the calculated correction to align an output of the printed dots on the first print station;
a second print station having a plurality of print elements each of which prints a second swath on the print media that prints a second image plane;
wherein second adjacent swaths are stitched together at the stitch locations;
a second linear sensor array has high-resolution sensor and low-resolution sensors;
wherein the high-resolution sensor having, at least two second high-resolution sensor arrays aligned with stitch locations of the second print station;
wherein the two second high-resolution sensor arrays are non-continuous;
transmitting an output of the second high-resolution sensor arrays to the controller;
wherein the controller calculates the second image plane stitch correction based on the two second high-resolution image; and wherein the controller, based on the calculated the second image plane stitch correction, adjusts at least one of a timing or a selection of the print elements of image data provided to printing dots on the second print station based on the calculated second image plane stitch correction to align an output of the printed dots on the second print station; and wherein the one first or the one second low-resolution sensors provides full image viewing.

* * * * *